United States Patent

De Seze et al.

[11] Patent Number: 5,995,835
[45] Date of Patent: Nov. 30, 1999

[54] METHOD OF HANDING OVER A CALL SET UP WITH A MOBILE STATION FROM ONE CELL TO ANOTHER WITHIN A CELLULAR RADIO NETWORK

[75] Inventors: Fabrice De Seze; Vinod Kumar, both of Paris, France

[73] Assignee: Alcatel N.V., Rijswijk, Netherlands

[21] Appl. No.: 08/817,764

[22] PCT Filed: Oct. 24, 1995

[86] PCT No.: PCT/FR95/01407

§ 371 Date: Apr. 24, 1997

§ 102(e) Date: Apr. 24, 1997

[87] PCT Pub. No.: WO96/13953

PCT Pub. Date: May 9, 1996

[30] Foreign Application Priority Data

Oct. 26, 1994 [FR] France .................................. 94 12820

[51] Int. Cl.⁶ .............................. H04Q 7/22; H04Q 7/30; H04Q 7/38

[52] U.S. Cl. .............................. 455/436; 45/441; 45/440; 45/442

[58] Field of Search ................................... 455/436, 441, 455/440, FOR 101, 437, 438, 442, 443

[56] References Cited

U.S. PATENT DOCUMENTS

| | | | |
|---|---|---|---|
| 5,101,501 | 3/1992 | Gilhousen | 455/33 |
| 5,260,943 | 11/1993 | Comroe et al. | 370/95.1 |
| 5,327,575 | 7/1994 | Menich et al. | 455/33.2 |
| 5,513,380 | 4/1996 | Ivanov et al. | 455/33.2 |
| 5,648,955 | 7/1997 | Jensen et al. | 370/252 |
| 5,711,003 | 1/1998 | Dupuy | 455/436 |
| 5,812,539 | 9/1998 | Dent | 455/68 |
| 5,924,033 | 7/1999 | Carlsson et al. | 455/436 |

FOREIGN PATENT DOCUMENTS

| | | | |
|---|---|---|---|
| 06 02 34A1 | 6/1994 | France | H04Q 7/04 |
| 626796-A1 | 11/1994 | Germany | H04Q 7/04 |
| WO9306663 | 4/1993 | WIPO . | |
| WO9311627 | 6/1993 | WIPO . | |

Primary Examiner—Dwayne D. Bost
Assistant Examiner—Alan Gantt
Attorney, Agent, or Firm—Sughrue, Mion, Zinn, Macpeak & Seas, PLLC

[57] ABSTRACT

The safe method of handing over a call set up with a mobile station (M) comprise the following cyclic steps:

a following base station (B(n)) receives (ET3) UP data (DM) of the call in a following channel (CH2), which UP data is transmitted by the mobile station (M) in a current channel (CH1) to a current base station;

the DOWN data of the call is transmitted (ET5) for a given duration (T) simultaneously both over said current channel (CH1) and over said following channel (CH2), from the current base station (B(n-1)) and from the following base station (B(n)) respectively as soon (ET4) as the propagation time difference (TA) between the respective instants at which said UP data is received by said current channel (CH1) and by said following channel (CH2) is less than a first predetermined threshold (S); and on expiry of said given duration (T), releasing (ET6, LIB) said call in said current channel, and validating said call in the following channel (CH2) as a new current channel.

6 Claims, 3 Drawing Sheets

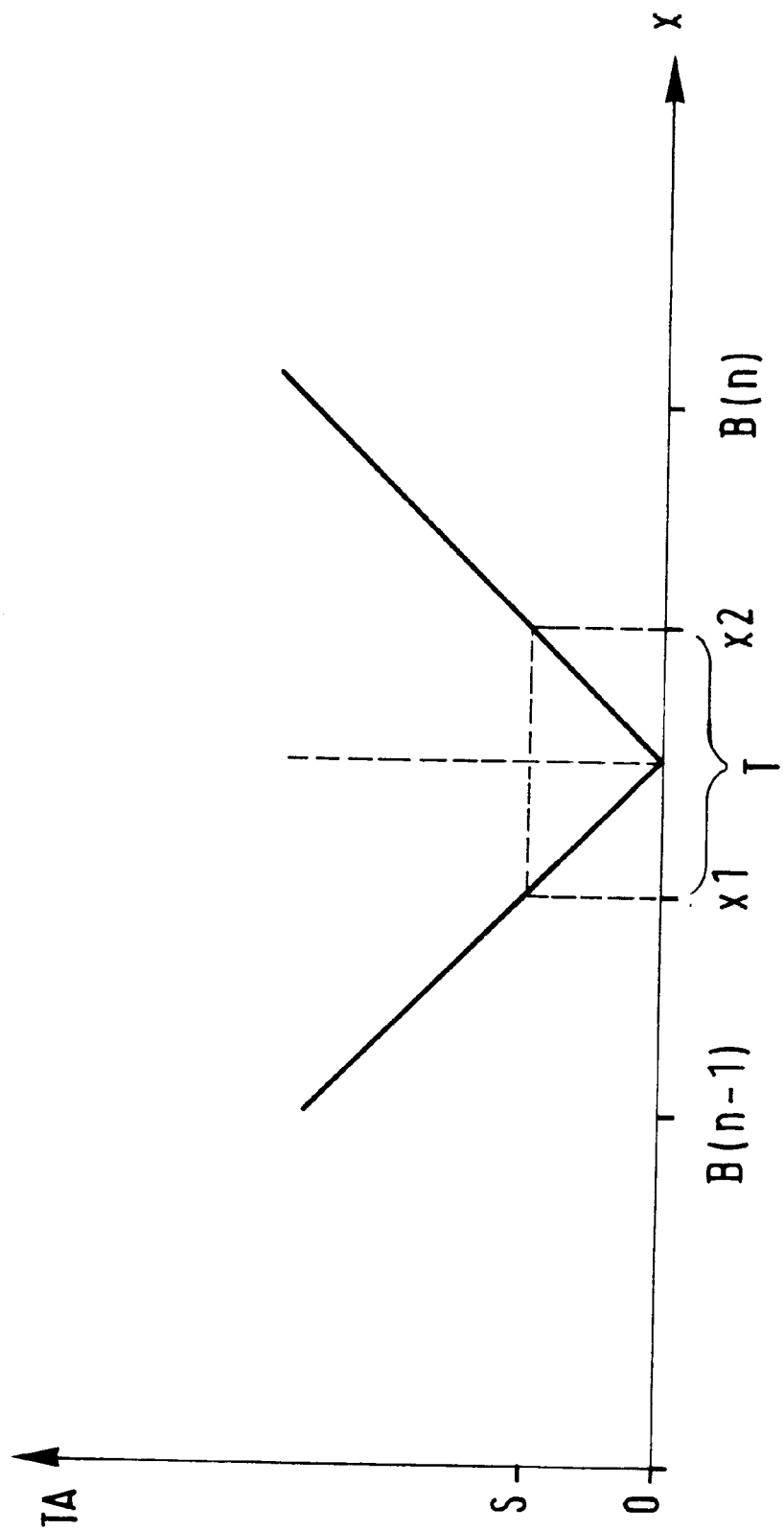

METHOD OF HANDING OVER A CALL SET UP WITH A MOBILE STATION FROM ONE CELL TO ANOTHER WITHIN A CELLULAR RADIO NETWORK

The present invention relates in general to a method of transferring a call set up with a mobile station in a digital cellular radio network from one cell to another. Such a transfer is generally referred to as a "handover". More particularly, the invention relates to a safe handover method for use in a transport network for handing over a call set up with a mobile station from a current channel associated with a current base station to a following channel associated with a following base station. The method is implemented along a mobile station path which is associated in deterministic manner with successive base stations in a radio network for communicating with mobile stations. In addition, the network is "synchronized", which means that the base stations in the network are synchronized with one another ignoring a substantially zero propagation time difference. The unit time intervals for conveying data in the transmit and receive channels for two arbitrary base stations of the radio network coincide.

In a cellular digital network of the GSM (global system for mobile communication) network, the handover of a call from a current channel to a following channel appears as a critical stage in call management. Such a handover can give rise to two types of momentary break in the call, referred to as a "synchronization" break and as a "power" break. A momentary synchronization break, which typically lasts for about 20 ms in GMS, stems from synchronization of the mobile station. The mobile station is synchronized in time and in frequency on the current channel prior to handover and it needs to resynchronize onto the following channel after handover. During the time required by the mobile station to achieve new synchronization, the call is momentarily interrupted. A power break is the result of the fact that when the mobile station is changing cells, it is located at maximum acceptable distances both from the current base station and from the following base station. In a notional zone at the boundary between two cells, the power of data received by the mobile station in said zone from each of the base stations concerned, i.e. the current station and the following station, is therefore at a minimum level. Radio propagation phenomena can thus cause the mobile station to cease receiving call data momentarily.

The prior art provides for remedying the causes of call synchronization breaks by providing a synchronized network in which the current and following channels concerned with a handover of a particular call are identical. In GSM, this identity of current and following channels gives rise to the same time interval and the same frequency. However, it provides no way of mitigating "power" breaks in a call that is set up.

A main object of the invention is to provide a safe method of channel-to-channel handover for a call set up with a mobile station in a radio network, that provides an effective remedy against power breaks in a call.

To this end, the invention provides a method of safely handing over a call set up between a mobile station using a current channel associated with a current base station to a following channel associated with a following base station along a path in a transport network for said mobile station, which path is associated in deterministic manner with successive base stations in a radio network for communication with mobile stations, the method being characterized in that said current and following channels are identical, and in that it comprises the following cyclical steps:

reception by at least one previously activated base station of UP data of said established call in said following channel as transmitted in said current channel by said mobile station;

measuring a propagation time difference between the respective instants at which said UP data is received by the current base station in said current channel and by the following base station in said following channel;

simultaneously transmitting, during a given duration, DOWN data for said call over said current and following channels respectively from said current base station and said following base station, as soon as said propagation time difference is less than a first predetermined threshold; and on expiry of said given duration, releasing said call in said current channel, and validating said call in the following channel as a new current channel.

In a first variant, the given duration is a predetermined fixed duration. In a second variant, the given duration expires as soon as the propagation time difference exceeds a predetermined threshold.

Advantageously, said following base station is determined as a function of said current base station, as a function of source and target base stations between which unsafe cell to cell handover is performed starting from said source base station through which the call is set up, and as a function of a base station sequence stored in the infrastructure of said radio network.

In practice, two opposite direction paths are defined for a length of the transport network in which the invention is to be implemented. Under such circumstances, the unsafe handover of the call to the target base station is performed on a channel selected from a respective one of two sets of channels as a function of said travel direction.

The successive base stations of the radio network which are associated in deterministic manner with the path of the mobile station comprise all of the base stations between the target base station towards which the unsafe channel-to-channel handover is performed and a last base station associated with a node or an end of the transport network.

Other characteristics and advantages of the present invention appear more clearly on reading the following description given with reference to the corresponding accompanying drawings, in which:

FIG. 3 is a graph showing propagation time difference for data received by two adjacent base stations and coming from the same mobile station, as a function of the position of the mobile station.

Figure 1:
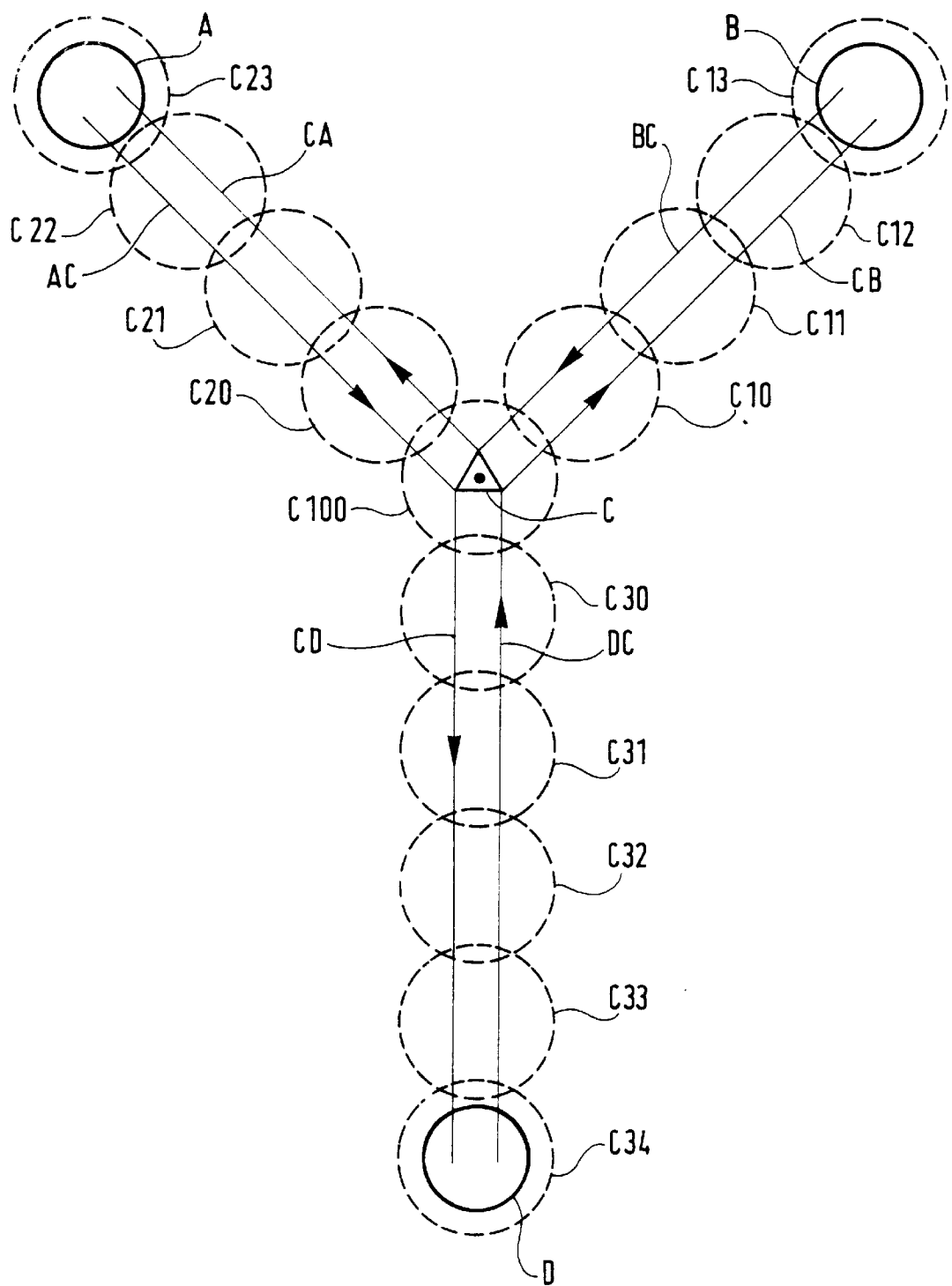
FIG. 1 shows the cells of successive base stations covering a portion of a transport network along which mobile stations travel.

It is important to observe that application of the safe channel-to-channel handover method of the invention for a call already set up with a mobile station is restricted to a mobile station that follows paths in a transport network of the "linear" type, typically a rail network or a motorway network. In the context of the invention, the definition that needs to be given to the term "path" is defined by the interpretation that results from the text below. Each path in a linear type transport network is associated in deterministic manner with successive base stations of a radio network for communicating with mobile stations. This notion is explained with reference to FIG. 1 which shows a portion of a rail transport network, typically a TGV network (train à grande vitesse=high speed train). The portion shown of the network comprises a node C and three ends A, B, and D which are associated, in practice, with rail stations. Two opposite direction tracks CD and DC interconnect the stations C and D, two opposite direction tracks CB and BC interconnect the stations C and B, and two opposite direction tracks CA and AC interconnect the stations C and A. The link between stations C and D is covered by M=6 base station coverage areas C100, C30, C31, C32, C33, and C34; the link between stations C and B is covered by M=5 base station coverage areas C100, C10, Cll, C12, and C13; and the link between stations C and A is covered by M=5 base station coverage areas C100, C20, C21, C22, and C23. All of the cells are of respective dimensions that are substantially identical. In practice, the differences between the dimensions of two respective cells is limited by tolerance determined by the technique of equalization filtering used in the mobile station. Equalization tolerance is defined as a maximum acceptable propagation time difference between two identical signals received by the terminal. For a propagation time difference that is less than the maximum acceptable propagation time difference, the purpose of equalization is to absorb said propagation time difference and thus, in the prior art, to remedy the problem that results from multipath propagation. For GSM terminals it is typically 20 microseconds. The definition of a path to which the method of the invention can be applied is specified below. For a given train provided with a mobile station starting from the rail station at node C and heading towards the rail station at end D, a call is established on departure of the train with the mobile station in a channel conveyed by a source base station associated with the source coverage area C100. The destination of the train is not known a priori by the mobile network and, as a result of the train moving, the first call handover from the cell C100 to the target cell C30 is performed in conventional manner, i.e. in a manner that is not "safe". Typically, in the context of GSM, such an unsafe handover is the result of the mobile station transmitting respective power levels for the beacon frequency signals transmitted by the adjacent base stations. The infrastructure of the radio network or "mobile" network typically controlling the base station or switching the mobile service and receiving such measured power levels takes a decision to transfer the call to the target base station C30 from which the mobile station receives the beacon frequency signal with maximum power. In accordance with the invention, the mobile network infrastructure stores the chaining or sequence of base stations for each of the links between A and C, B and C, and D and C. As a result of this unsafe handover of the call from cell C100 to cell C30, the mobile network infrastructure can deduce which cells C31 to C34 will be passed through in succession by the mobile station, since it is known firstly from the unsafe transfer which direction the mobile station is taking and secondly, from the stored sequence, which stations are to be found in succession in that direction. Thus, for a train leaving C and heading towards D, the path of the mobile station can be associated in deterministic manner with successive base stations of the radio network starting from the mobile station being located in cell C30, following the unsafe transfer and terminating in the rail terminus station C34. In another example, for a train leaving D and heading towards A, the path of the mobile station can be associated deterministically with successive base stations of the radio network starting from the mobile station being located in cell C33 following unsafe transfer from cell C34 to said cell C33, and terminating with the mobile station being located in the cell associated with rail station A. In practice, the successive base stations of the radio network which are associated in deterministic manner with said path of the mobile station comprise all of the base stations between the target base station towards which a first channel-to-channel handover takes place in unsafe or conventional manner, starting from a source base station through which the call is set up, and ending at a last base station associated with a node or an end of the transport network.

Figure 2:
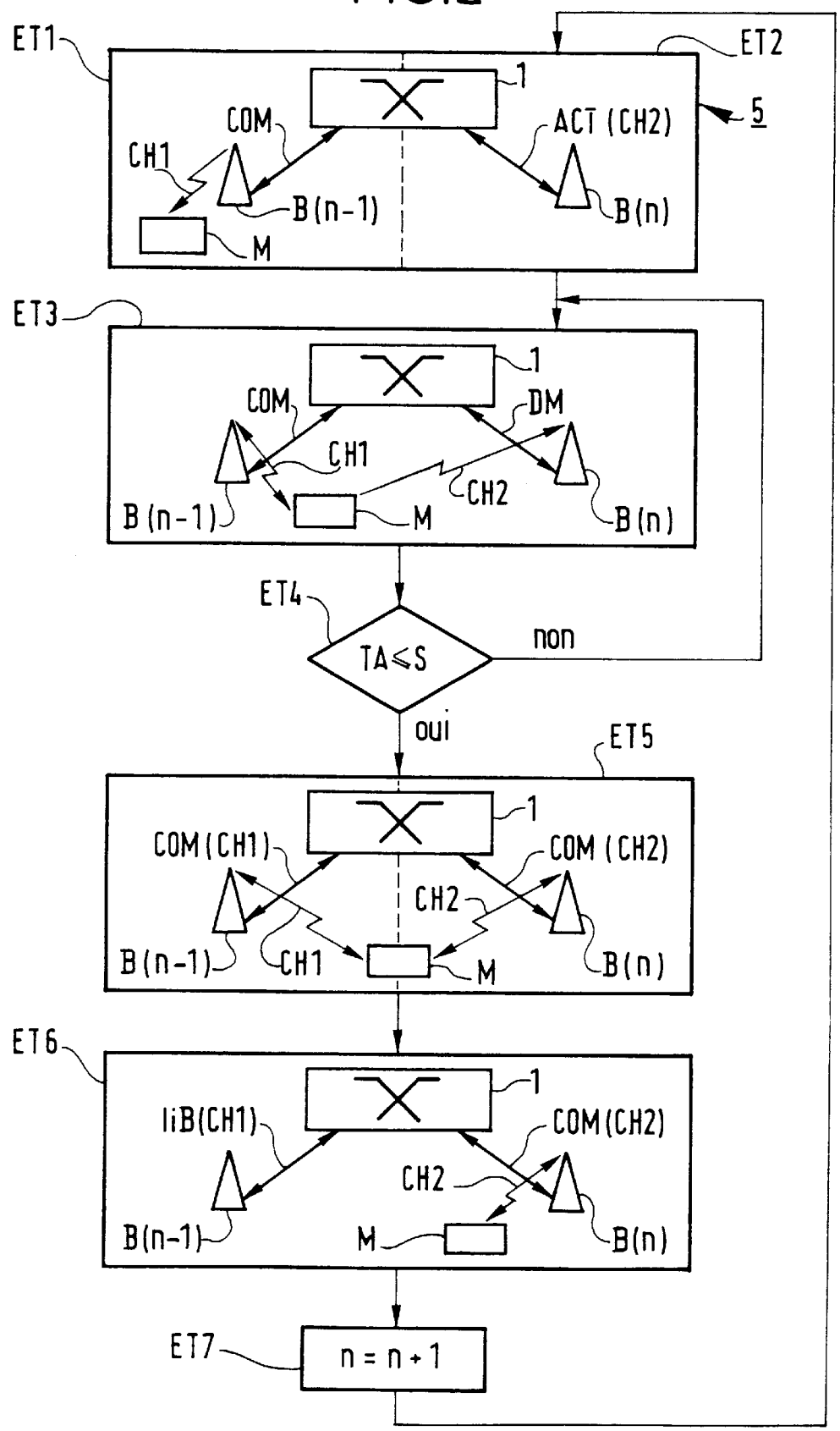
FIG. 2 shows the steps of the method of the invention.

Apart from the case of an unsafe cell-to-cell handover being performed starting from a first or source base station through which the call is initially set up, and transferring to an unforeseen following base station, the subsequent following base station, or plurality of following base stations at a node rail station, can be determined in the infrastructure as a function of the current base station, of the travel direction of the mobile station as defined by the source and target base stations between which said unsafe cell to cell handover took place, and of the sequence of base stations as stored in the infrastructure of the radio network. This ability to determine the following base station(s) as a function of the current base station makes it possible to implement the method of the invention, as described below with reference to FIG. 2.

Initially, in a first step ET1, UP data transmitted by the mobile station M to the infrastructure 1, and DOWN data transmitted from the infrastructure 1 to the mobile station M for the call COM conveyed in a current channel CH1 passes via a current base station B(n−1), of rank (n−1). In step ET2, as soon as said call COM is conveyed via base station B(n−1), the infrastructure 1 activates ACT on receiving the following base station B(n) of rank $\underline{n}$ on the following channel CH2 which is identical to the current channel CH1. In a digital network, identity between channels CH1 and CH2 means that they have identical frequencies or identical frequency patterns in the frequency hopping technique, and identical time intervals. The following base station B(n) is determined by the infrastructure as described above. In response, in step ET3, the call is still conveyed over the channel CH1 to the base station B(n−l), and additionally UP data DM of the call as transmitted by the mobile station M is received by the following base station B(n) that is activated to receive. Because of the difference between the two distances between the mobile station M and the current base station B(n−1) and the following base station B(n), the UP data of the call COM as received by the infrastructure 1 via the current base station B(n−1) and the same UP data DM for the call COM as received by the infrastructure 1 via the following base station B(n) is subject to a propagation time difference TA. This propagation time difference TA is equal to the difference in the propagation times between the mobile station and the two base stations B(n−1) and B(n). In step ET4, the infrastructure 1 determines whether this measured propagation time difference TA is less than a predetermined threshold S. As soon as said propagation time difference TA is less than the predetermined threshold, provision is made for the DOWN data of the call to be transmitted simultaneously for a given duration T towards the mobile station M over both said current channel CH1 and said following channel CH2 by said current and following base stations respectively (step ET5), it being understood that DOWN data is already being transmitted over the channel CH1. In addition, power measurements and quality measurements on the signals received by the current and following base stations B(n−1) and B(n) respectively over the current and following channels CH1 and CH2 may also be performed to validate the step of undertaking simultaneous transmission. In this way, a transmission diversity technique is implemented by the base stations B(n−1) and B(n), thereby guaranteeing better quality of call reception by the mobile station M. In addition, such transmission diversity is implemented only for the given duration T so as to avoid interference between data transmitted over the current channel and the following channel. In practice, this given duration T is such that the respective propagation time differences between the mobile station M and the base station B(n-1) and between the mobile station M and the base station B(n) during said given duration T is not excessive. Two variants are proposed for selecting the given duration T. In a first variant, the given duration T is a predetermined fixed duration defined in the infrastructure 1. In a second variant, this given duration T expires as soon as the propagation time difference TA crosses a predetermined threshold that may be identical to the predetermined threshold S that triggers simultaneously transmission. FIG. 3 shows this second variant. It is in the form of a graph showing the value of the propagation time difference TA as a function of the position x of the mobile station M relative to the current base station B(n-1) and the following base station B(n). Simultaneous transmission is triggered as soon as the propagation time difference TA crosses the threshold S, with the mobile station being in a position x1, and it is interrupted as soon as said propagation time difference moves back above said threshold S, when the mobile station M reaches position x2. After the given duration T has expired, the infrastructure releases, LIB, the current channel CH1 associated with the base station B(n-1), and the call COM is validated in the following channel CH2 associated with base station B(n). The call COM in the following channel CH2 must be uniquely validated by the infrastructure 1 since this channel CH2 conveys the UP data DM from the mobile station to the infrastructure 1 (step ET3) and the DOWN data transmitted from the infrastructure to the mobile station M (step ET5). Given that the method of the invention is iterative by nature, as shown by step ET7 in which the index n is incremented by one, the base station following the base station B(n), that has now become the new current base station, i.e. base station B(n+1), is activated to receive in a new safe transfer cycle beginning at step ET2.

It should be observed that in the infrastructure 1, following step ET2, only the UP data of the call COM received by the infrastructure 1 via the current base station B(n-1) is actually retained or used for the purpose of the call established between the mobile station M and a remote station, with the UP data DM of the call COM as received by the infrastructure 1 via the following base station B(n) being used, in combination with the UP data of the call COM as received by the infrastructure 1 via the current base station B(n-1), solely for the purpose of determining a propagation time difference TA.

In the above description, and in particular with reference to step ET2, only one following base station B(n) is activated. Nevertheless, when the mobile station passes through a node rail station, a plurality of following base stations are activated in accordance with the invention. Thus, with reference to FIG. 1, for the example of a mobile station travelling from D to A, on passing through cell C100, it is appropriate to activate two following base stations associated with cells C20 and C10 respectively. Power measurement is then performed in each of the activated following base station so that on expiry of a predetermined duration, it is possible to release the following channel being used with that one of the following base stations which is not receiving the established call at sufficient power, i.e. in this example, the base station associated with coverage area C10.

Each length of the transport network between the rail station(s) of node C and/or the terminus rail station(s) A, B, and D defines two paths in opposite directions which are carried by two respective tracks, such as AC and CA for the length interconnecting A and C. For a path from a first mobile station carried by a track in a given direction, the method of the invention requires a following channel to be available in the following base station which is identical to the current channel carrying the call with the mobile station. This means that it is necessary to define two respective sets of channels for the two directions, since otherwise it could happen that a mobile station in one train cannot benefit from a following channel in a following base station that is identical to the current channel in the current base station, assuming that the following channel is already in use by a mobile station in a train travelling in the opposite direction. The invention remedies the above by proposing that in all base stations of a length of a transport network, a respective set of channels is allocated to each of the two train travel directions. The infrastructure 1 is also designed so that the channel to which the unsafe transfer is performed, i.e. the first transfer, starting from a source base station where a call is set up towards a target base station, is selected from a respective one of the two sets of channels as a function of the travel direction of the mobile station. This travel direction is known to the infrastructure firstly as a function of the source base station through which the call is established, and secondly as a function of the target base station towards which channel handover is requested.

We claim:

1. A method of making a safe handover of a call set up between a mobile station using a current channel associated with a current base station to a following channel associated with a following base station, along a transport network path associated in deterministic manner with successive base stations in a mobile station radio network, the method comprising:

activating a base station along the path as the following base station;

receiving, at the following base station in the following channel, UP data of the call as transmitted in the current channel by the mobile station, the current channel and the following channel being the same;

measuring a propagation time difference between receipt of the UP data by the current base station in the current channel and by the following base station in the following channel;

simultaneously transmitting DOWN data for the call, during a given duration, from the current base station over the current channel and from the following base station over the following channel, in response to a comparison between the propagation time difference and a first predetermined threshold; and after the given duration, releasing the call in the current channel, and validating the call in the following channel as a new current channel.

2. The method according to claim 1, wherein the following base station is determined as a function of:

the current base station, source and target base stations, between which an unsafe handover is performed, starting from the source base station through which the call is set up, and a base station sequence stored in the infrastructure of the radio network.

3. The method according to claim 2, wherein two opposite direction paths are defined for a length of the transport network, and wherein the unsafe handover of the call to the target base station is performed on a channel selected from one of two sets of channels, as a function of the travel direction of the mobile station.

4. The method according to claim 3, wherein the successive base stations associated with the path of the mobile station comprise all of the base stations between the target base station and a last base station associated with a node or an end of the transport network.

5. The method according to claim 1, wherein the given duration is predetermined and fixed.

6. The method according to claim 1, wherein the given duration expires in response to a comparison between the propagation time difference and a second predetermined threshold.

* * * * *